(12) United States Patent
Farley et al.

(10) Patent No.: US 11,925,143 B2
(45) Date of Patent: Mar. 12, 2024

(54) INFEED BELT CONVEYOR AT COMBINE FEEDER

(71) Applicant: CNH Industrial America LLC, New Holland, PA (US)

(72) Inventors: Herbert M Farley, Elizabethtown, PA (US); Joseph Neil Oberlander, Durant, IA (US); Dan Lawrence Garland, Solon, IA (US); Mark D. Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 51 days.

(21) Appl. No.: 17/824,085

(22) Filed: May 25, 2022

(65) Prior Publication Data

US 2022/0279722 A1    Sep. 8, 2022

Related U.S. Application Data

(63) Continuation of application No. 16/527,928, filed on Jul. 31, 2019, now Pat. No. 11,343,969.

(60) Provisional application No. 62/712,435, filed on Jul. 31, 2018.

(51) Int. Cl.
*A01D 61/00* (2006.01)
*A01D 41/06* (2006.01)
*A01D 41/12* (2006.01)
*A01D 45/02* (2006.01)
*A01D 61/02* (2006.01)

(52) U.S. Cl.
CPC ........... *A01D 61/004* (2013.01); *A01D 41/06* (2013.01); *A01D 41/12* (2013.01); *A01D 45/021* (2013.01); *A01D 61/008* (2013.01); *A01D 61/02* (2013.01)

(58) Field of Classification Search
CPC ...... A01D 61/004; A01D 41/06; A01D 41/12; A01D 45/021; A01D 61/008; A01D 61/02; A01D 41/14; A01D 41/16; A01D 57/20; A01D 47/00; A01D 45/02
See application file for complete search history.

(56) References Cited

U.S. PATENT DOCUMENTS

| | | |
|---|---|---|
| 1,990,054 A | 11/1927 | Thoen |
| 2,397,681 A | 11/1944 | Mulvany et al. |
| 2,587,289 A | 2/1952 | Cook |
| 2,875,887 A | 3/1959 | Hinchcliffe |
| 2,956,385 A | 10/1960 | Porter |
| 2,999,348 A | 9/1961 | Cunningham |
| 4,038,809 A | 8/1977 | Arnould et al. |

(Continued)

FOREIGN PATENT DOCUMENTS

| | | |
|---|---|---|
| CA | 1267292 A | 4/1990 |
| CN | 110352698 A | 10/2019 |

(Continued)

*Primary Examiner* — Arpad F Kovacs (74) *Attorney, Agent, or Firm* — Peter K. Zacharias (57) ABSTRACT

A header of a combine harvester includes a belt conveyor configured to direct a movement of harvested crop material toward a feederhouse of the combine harvester. The belt conveyor is located adjacent an inlet of the feederhouse. The belt conveyor includes at least one protrusion extending radially from the belt conveyor that helps direct movement of harvested crop material toward the feederhouse.

20 Claims, 11 Drawing Sheets

(56) References Cited

U.S. PATENT DOCUMENTS

| | | | | |
|---|---|---|---|---|
| 4,177,626 A | * | 12/1979 | McNaught | A01D 61/008 198/669 |
| 4,229,932 A | | 10/1980 | Persoons et al. | |
| 4,316,536 A | | 2/1982 | Verbeek | |
| 4,539,799 A | | 9/1985 | Kalverkamp | |
| 4,956,966 A | | 9/1990 | Patterson | |
| 5,005,343 A | | 4/1991 | Patterson | |
| 5,464,371 A | * | 11/1995 | Honey | A01D 41/14 56/189 |
| 6,116,010 A | | 9/2000 | Salley | |
| 6,202,397 B1 | | 3/2001 | Watts et al. | |
| 6,298,644 B1 | | 10/2001 | Sandei | |
| 6,817,166 B2 | | 11/2004 | Dunn | |
| 6,865,871 B2 | | 3/2005 | Patterson et al. | |
| 7,478,522 B1 | | 1/2009 | Lovett et al. | |
| 7,827,773 B2 | | 11/2010 | Sauerwein et al. | |
| 7,958,711 B1 | | 6/2011 | Sauerwein | |
| 7,992,372 B1 | | 8/2011 | Coers et al. | |
| 8,479,483 B1 | | 7/2013 | Huseman et al. | |
| 9,144,197 B2 | | 9/2015 | Gahres | |
| 9,220,198 B2 | | 12/2015 | Fuechtling | |
| 9,320,198 B2 | | 4/2016 | Trowbridge et al. | |
| 9,795,086 B2 | | 10/2017 | Hasenour | |
| 9,814,181 B2 | * | 11/2017 | Wenger | A01D 47/00 |
| 9,814,182 B2 | | 11/2017 | Mulder et al. | |
| 9,848,533 B2 | | 12/2017 | Vandergucht et al. | |
| 2007/0193243 A1 | | 8/2007 | Schmidt et al. | |
| 2007/0238565 A1 | | 10/2007 | Marler | |
| 2007/0251202 A1 | | 11/2007 | Coers et al. | |
| 2007/0283673 A1 | | 12/2007 | Coers et al. | |
| 2008/0276591 A1 | | 11/2008 | Tippery et al. | |
| 2008/0295474 A1 | * | 12/2008 | Tippery | A01D 57/20 56/153 |
| 2009/0217639 A1 | * | 9/2009 | Lohrentz | A01D 75/182 56/364 |
| 2011/0094201 A1 | | 4/2011 | Bomleny et al. | |
| 2014/0290200 A1 | | 10/2014 | Trowbridge et al. | |
| 2015/0121830 A1 | | 5/2015 | Gahres | |
| 2015/0156969 A1 | | 6/2015 | Mossman | |
| 2015/0195993 A1 | | 7/2015 | Hasenour et al. | |
| 2016/0242358 A1 | | 8/2016 | Mossman | |
| 2016/0345497 A1 | | 12/2016 | Hasenour | |
| 2018/0084724 A1 | | 3/2018 | Fuchtling | |
| 2019/0029177 A1 | | 1/2019 | Enns et al. | |
| 2019/0104682 A1 | | 4/2019 | Mossman | |

FOREIGN PATENT DOCUMENTS

| | | | | |
|---|---|---|---|---|
| DE | 102018212834 A1 | * | 2/2020 | ........... A01D 45/021 |
| EP | 0432318 A1 | | 6/1991 | |
| EP | 2764765 A1 | | 8/2014 | |
| EP | 2856854 A1 | | 4/2015 | |
| EP | 2883439 A1 | | 6/2015 | |
| EP | 3090615 A1 | * | 11/2016 | ........... A01D 41/142 |
| EP | 3097761 A1 | * | 11/2016 | ............ A01D 34/02 |
| EP | 3153007 A1 | | 4/2017 | |
| EP | 3229579 B1 | * | 3/2020 | ............ A01D 41/14 |
| EP | 3756444 A1 | * | 12/2020 | ........... A01D 61/004 |
| EP | 3811765 A1 | * | 4/2021 | ............ A01D 34/00 |
| WO | WO-2006133116 A2 | * | 12/2006 | ............ A01D 43/06 |

* cited by examiner

INFEED BELT CONVEYOR AT COMBINE FEEDER

CROSS-REFERENCE TO RELATED APPLICATION

The present application is a continuation of U.S. application Ser. No. 16/527,928, entitled "INFEED BELT CONVEYOR AT COMBINE FEEDER," filed Jul. 31, 2019, which claims priority from and the benefit of U.S. Provisional Application Ser. No. 62/712,435, entitled "INFEED BELT CONVEYOR AT COMBINE FEEDER," and filed Jul. 31, 2018. Each of the foregoing applications is hereby incorporated by reference in its entirety for all purposes.

BACKGROUND

The disclosure relates generally to a infeed belt conveyor for a header for use with combine harvesters.

An agricultural combine is a machine used to harvest a variety of crops from a field. During a harvesting operation, a corn header at the front of the combine cuts ripened crop from the field. Row dividers of a corn header (i.e., a type of header) directs row of corn stalks to ear separation chambers or stripping plates and then to an auger. The auger advance the crop towards the vehicle centerline (i.e., near an inlet for the combine feeder). A feederhouse transfers the crop material into the combine by way of a conveyor such as an elevator assembly. Processing machinery such as threshing and separating assemblies within the combine further separate, clean and/or transfer the grain for storage.

During harvesting, crop feeding at high throughput rates results in material other than grain (MOG) bunching directly in front of the combine feeder that resists transfer from the header to the combine. This causes the operator either to slow down or stop harvesting altogether if the MOG becomes a plug that stops feeding into the combine feeder. Therefore, there is a need for a header that minimizes or avoids the buildup of MOG in front of the combine feeder.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a header of a combine harvester is provided. The header includes a belt conveyor configured to direct a movement of harvested crop material toward a feederhouse of the combine harvester. The belt conveyor is located adjacent an inlet of the feederhouse. The belt conveyor includes at least one protrusion extending radially from the belt conveyor that helps direct movement of harvested crop material toward the feederhouse.

In another embodiment, a header of a combine harvester is provided. The header includes an auger configured to direct a movement of harvested crop material toward a feederhouse of the combine harvester. The header also includes a trough located beneath the auger. The header also includes a belt conveyor located within an opening of the trough in front of an inlet of the feederhouse. The belt conveyor is configured to direct the movement of the harvested crop material toward the feederhouse of the combine harvester. A rear portion of the belt conveyor extends past a rearward portion of the header and is configured to extend into the inlet of the feederhouse.

In a further embodiment, a combine harvester is provided. The combine harvester includes a feederhouse including an inlet for receiving harvested crop material. The combine harvester also includes a header. The header includes a belt conveyor configured to direct a movement of the harvested crop material toward the feederhouse of the combine harvester. The belt conveyor is located adjacent the inlet of the feederhouse. The belt conveyor includes at least one protrusion extending radially from the belt conveyor that helps direct movement of harvested crop material toward the feederhouse.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
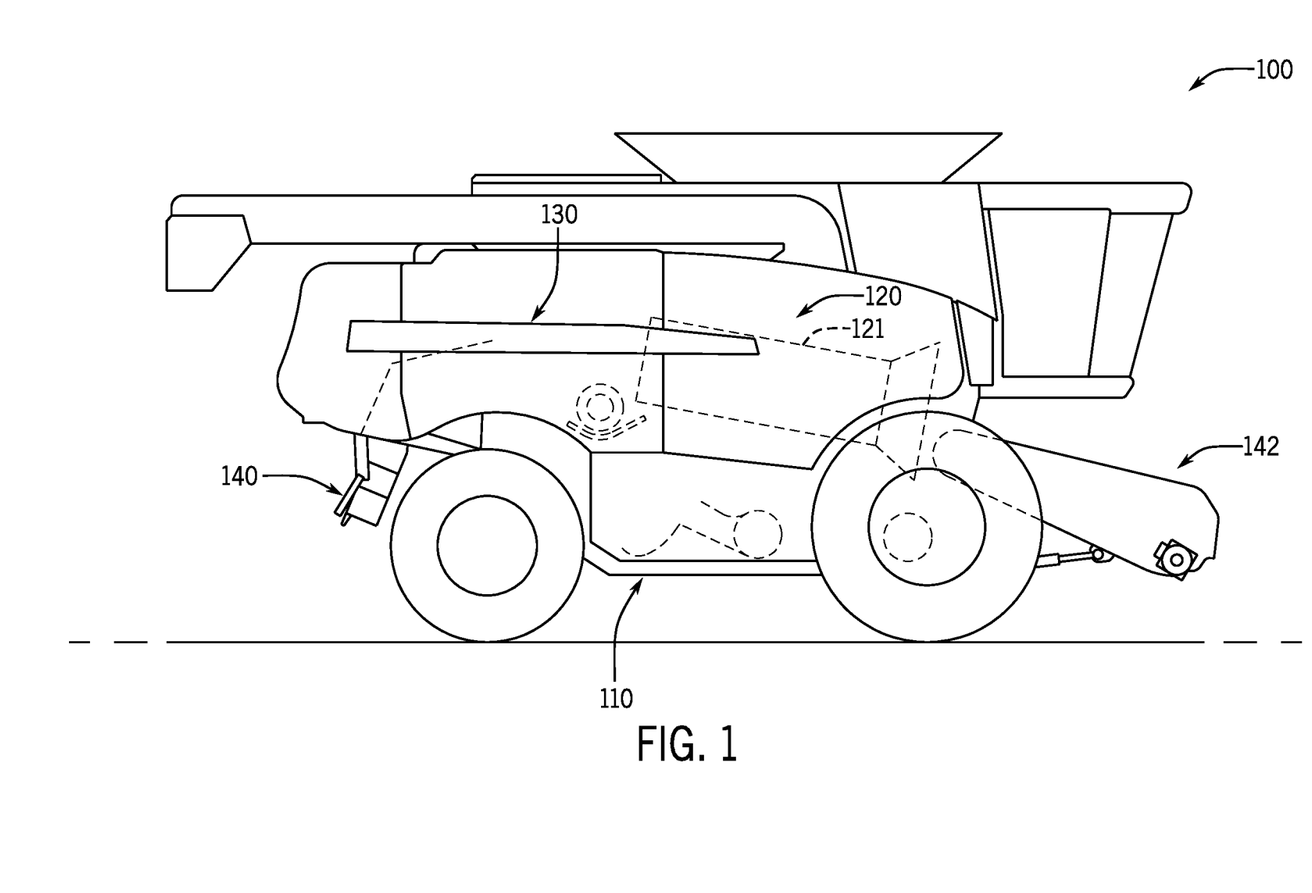
FIG. 1 is a side view of an embodiment of an agricultural harvester having a header of the present disclosure.

FIG. 1 shows an agricultural combine 100 (e.g., combine harvester), which includes a chassis 110 carrying the usual harvesting apparatus (not all of which is shown). As described in greater detail below, the agricultural combine 100 includes a header 112 (e.g., corn header) that includes a belt conveyor that helps actively direct movement of a harvested crop material (e.g., corn and MOG) towards an inlet of a feederhouse 142 of the agricultural combine 100. The agricultural combine 100 includes an axially oriented crop processing system 120 that receives harvested crop. In addition, the agricultural combine 100 includes a crop residue handling system 130 with a crop residue spreading system 140 positioned at the aft end of the combine 100. The crop processing system includes a cylindrical threshing rotor 121 that conveys a flow of crop material in a helical flow path. As the crop material is moved through the processing apparatus 120, the desired crop such as grain or other material is loosened and separated from crop residue such as husk and pods in a cleaning system located beneath the threshing rotor 121.

Figure 2:
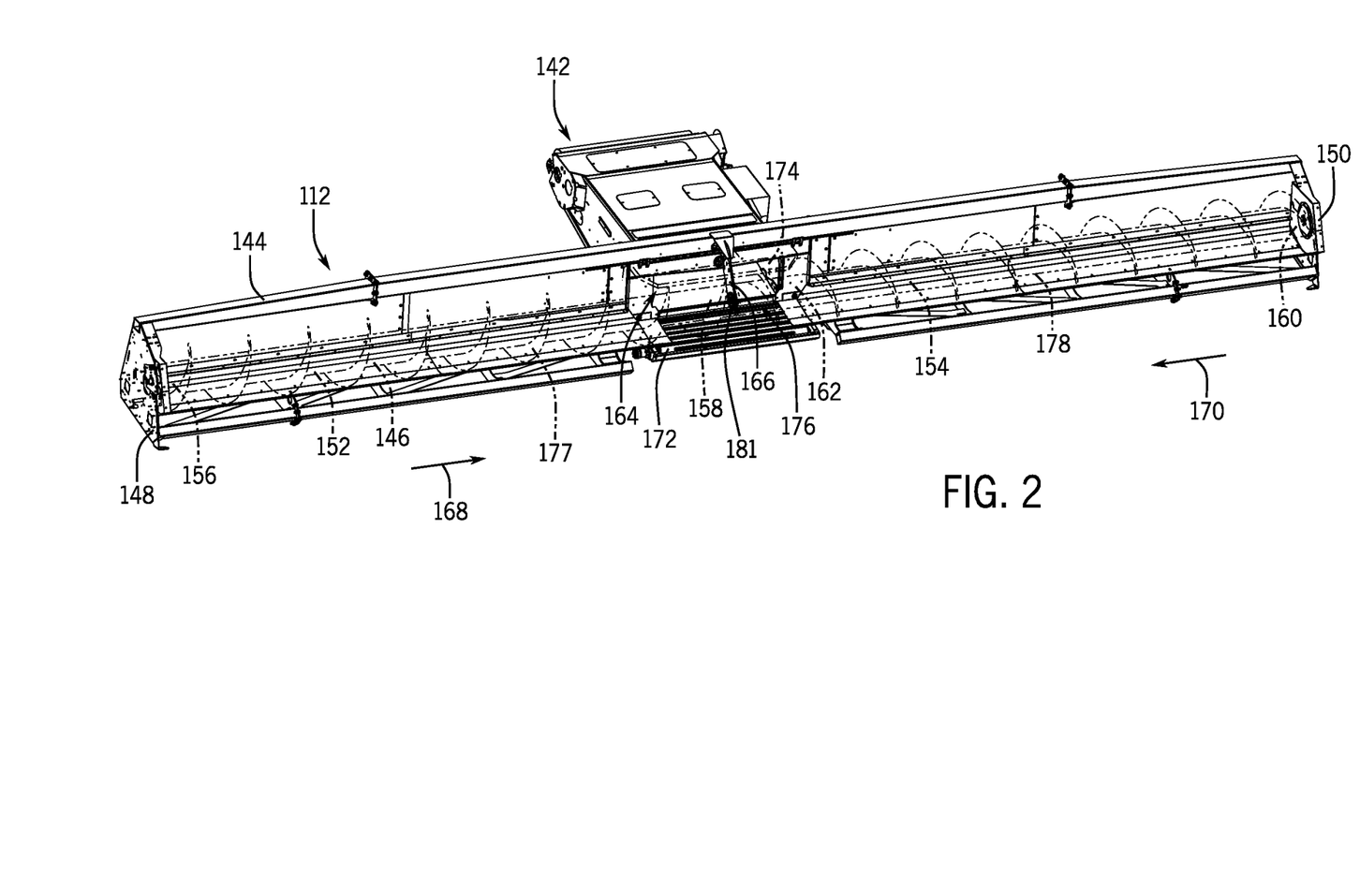
FIG. 2 is a top perspective view of an embodiment of a header (e.g., corn header) coupled to a feederhouse for the agricultural harvester of FIG. 1.

FIG. 2 is a top perspective view of an embodiment of the header 112 (e.g., corn header) coupled to a feederhouse 142 for the agricultural harvester of FIG. 1. It should be noted that not all components of the header 112 are shown (e.g., row divider, row unit, etc.). The header 112 includes a frame 144 coupled to the feederhouse 142. The header 112 also includes an auger 146 that extends lengthwise across the frame 144 between side portions 148, 150 of the frame 144. The auger 146 includes a first auger section 152 and a second auger section 154 that are separate from each other. The first auger section 152 includes ends 156 and 158. The second auger section 154 includes ends 160 and 162. The ends 156, 160 are coupled to the side portions 148, 150, respectively, of the frame 144. The ends 158, 162 are coupled to the frame 144 adjacent an inlet 164 of the feederhouse 142 via supports 166. The ends 158, 162 abut each other in a collinear arrangement to form the auger 146. The auger 146 directs movement of the harvested crop material toward the inlet 164 of the feederhouse 142. The first auger section 152 is configured to flight the harvested crop material in a direction 168 extending from the end 156 toward the end 158. The second auger section 154 is configured to flight the harvested material in a direction 170 from the end 160 toward the end 162.

As described in greater detail below, a belt conveyor 172 (e.g., belt feeding system) is disposed adjacent (e.g., in front of) to the inlet 164 of the feederhouse 142. The belt conveyor is located beneath both the auger 146 and an overhang 174. The overhang 174 is centrally located relative to the longitudinal length of the header 144 above the inlet 164. The overhang 174 extends away from a top portion of the header 144. The belt conveyor 172 is centrally located relative to a longitudinal length of the header 112. The belt conveyor 172 is located within a central opening 176 of a header floor or trough (e.g., auger trough) 178. The belt conveyor 172 is configured to actively assist movement of the harvested crop material toward the inlet 164 of the feederhouse 142 via rotation of the belt toward the inlet 164. In particular, the belt conveyor 172 directs movement of the harvested crop material toward a feeder drum adjacent the inlet 164 of the feederhouse 142, where the feeder drum grabs and feeds the harvested crop material into the combine 100. The belt conveyor 172 introduces the harvested crop material into feederhouse 142 in a gentler manner than typical methods, thus, resulting in reduced grain damage and losses. The belt conveyor 172 creates pressure toward the feeder while reducing recirculation of material away from the feeder to minimize or avoid buildup of MOG in front the inlet 164. The speed of the belt conveyor 172 is adjustable.

As depicted in FIG. 2 (as well as FIGS. 3 and 4), flighting 177 of the auger extends until the ends 158, 162 of the auger 146. In certain embodiments, the flighting 177 may end along the auger 146 prior to the ends 158, 162. In certain embodiments, the flighting 177 ends along the auger 146 upstream of the outer edge of the inlet 164. In certain embodiments, the flighting 177 ends along the auger 146 at or a little downstream of the outer edge of the inlet 164 (see FIG. 10). In certain embodiments, the flighting 177 is reverse flighting to assist directing movement of the harvested crop material toward the inlet 164. In certain embodiments, the auger 146 includes a rubber flap or paddle coupled to a connector 181 coupled adjacent the ends 158, 162 of the auger 146. The flap or paddle is configured to direct movement of the harvested crop material toward the inlet 164.

Figure 3:
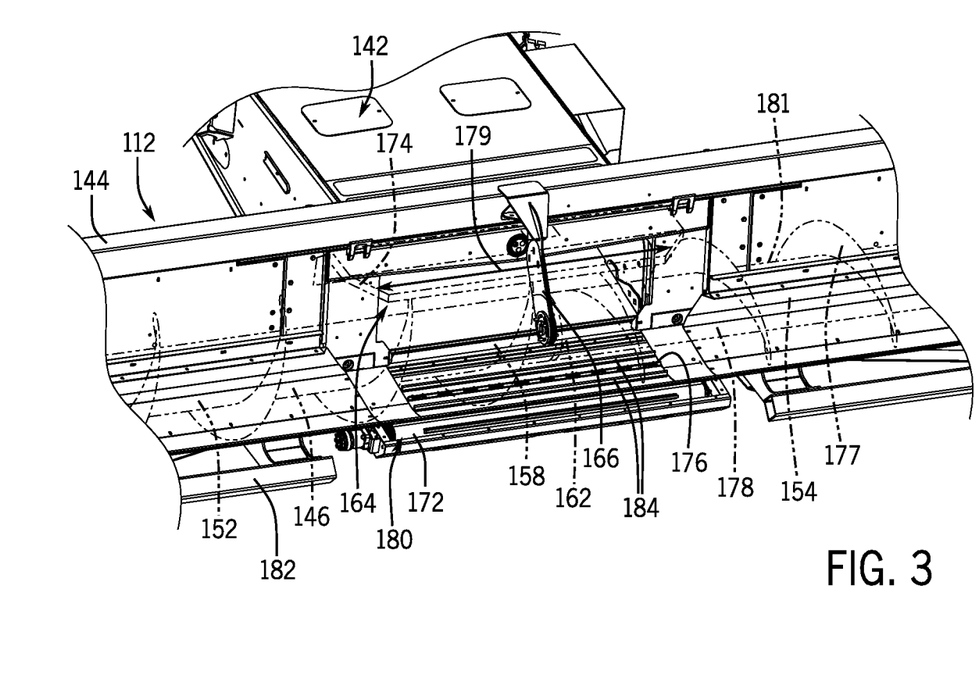
FIG. 3 is a top perspective view of a portion of the header coupled to the feederhouse in FIG. 2.
Figure 4:
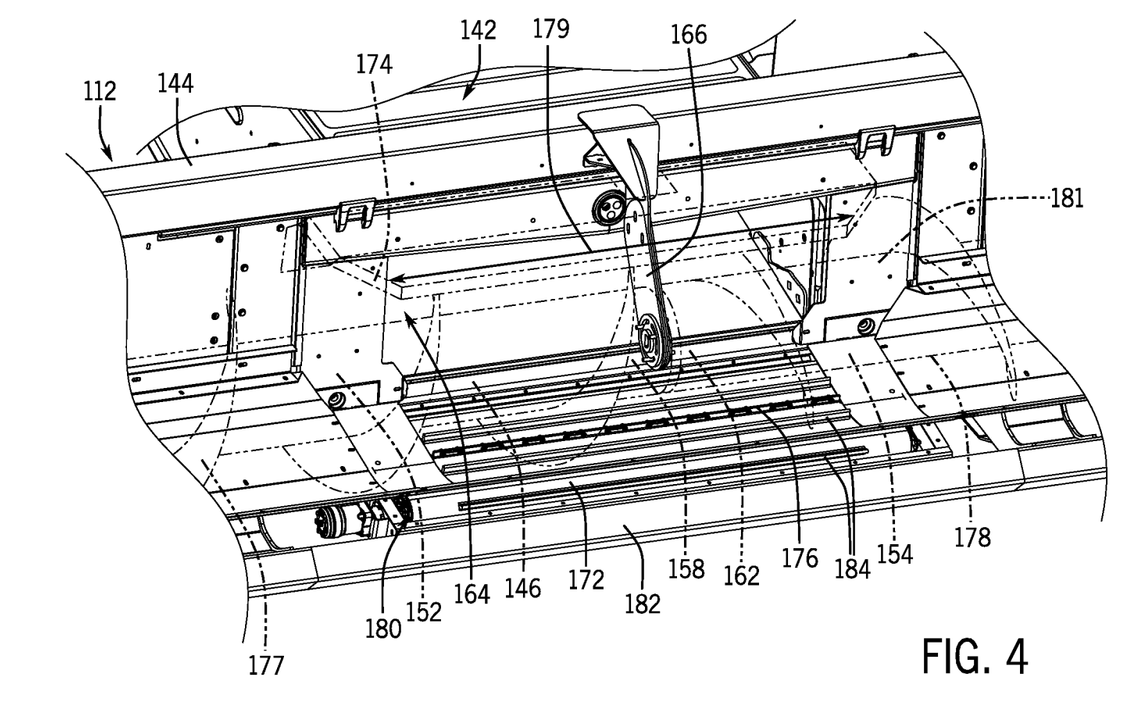
FIG. 4 is a top perspective view of a portion of the header coupled to the feederhouse in FIG. 2.

FIGS. 3 and 4 are top perspective views of a portion of the header 112 coupled to the feederhouse 142 in FIG. 2. The belt conveyor 172 is located within the central opening 176 of the header floor or trough (e.g., auger trough) 178. The belt conveyor 172 extends across an entire width 179 of the inlet 164. A front portion 180 of the belt conveyor is located adjacent a bottom portion 182 of the frame 144. The belt conveyor 180 is angled up (e.g., an acute angle relative to the ground) towards toward the inlet 164 of the feederhouse 142 from the bottom portion 182. The belt conveyor 172 is configured to actively assist movement of the harvested crop material toward the inlet 164 of the feederhouse 142 via rotation of the belt toward the inlet 164.

Figure 5:
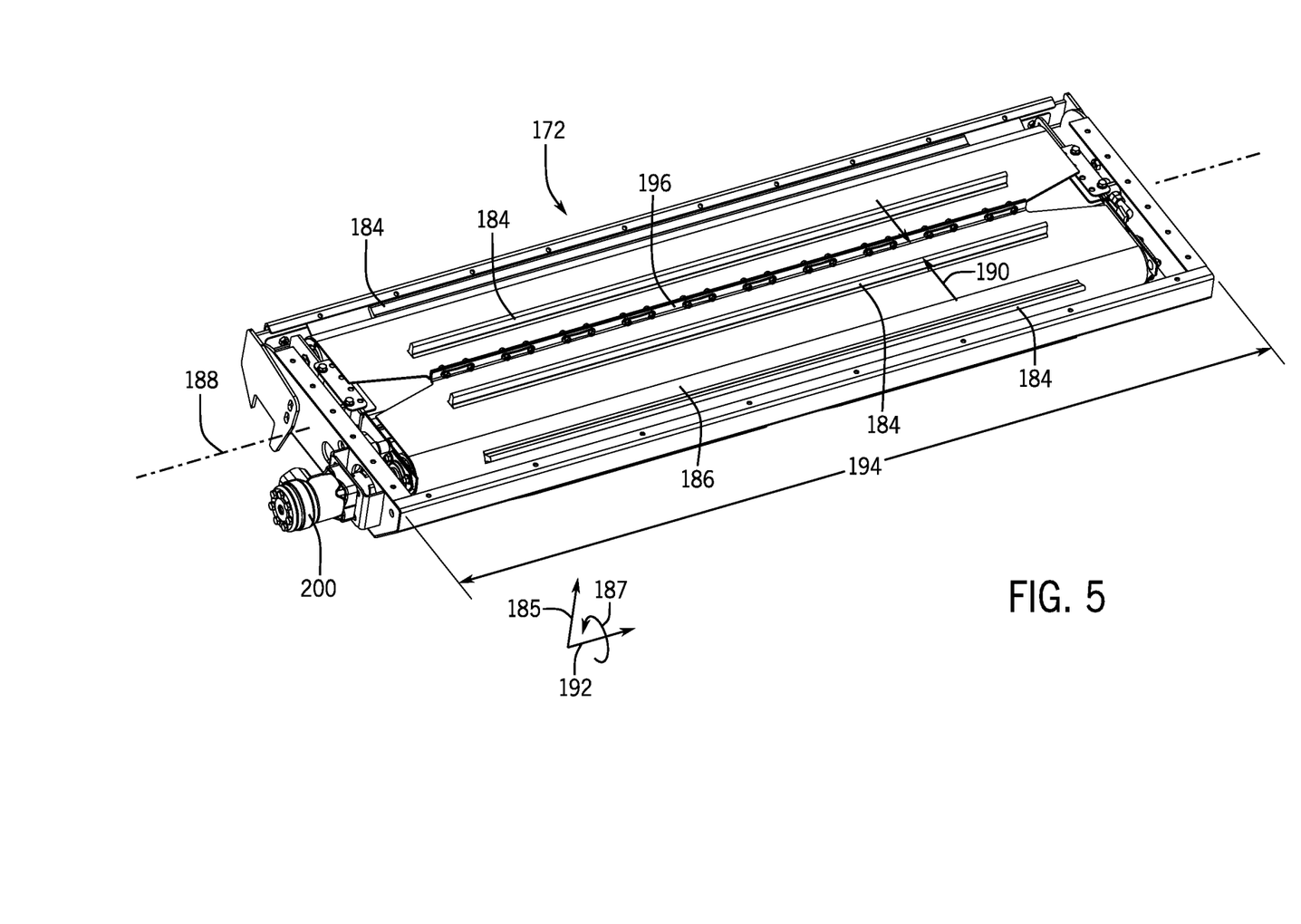
FIG. 5 is a perspective view of an embodiment of an infeed belt conveyor.

As depicted in FIG. 5 (along with FIGS. 3 and 4), the belt conveyor 172 includes multiple protrusions or ridges 184 that assist movement of the harvested crop material toward the inlet 164. In certain embodiments, the belt conveyor 172 may only include a single protrusion 184. The number of protrusions 184 may vary (e.g., 1, 2, 3, 4, 5, 6, 7, 8, or more). The protrusions 184 extend radially 185 from a surface of a belt 186. The protrusions 184 are circumferentially 187 spaced apart about a longitudinal axis 188 of the belt conveyor 172. A distance 190 between adjacent protrusions 184 may be constant or vary about the belt 186. The protrusions 184 extend in an axial direction 192 along the longitudinal axis 188. In addition, the protrusions 184 extend along a majority of a longitudinal length 194 of the belt conveyor 174. The belt 186 is fastened together about one or more idlers and/or pulleys (not shown) at a protrusion 196. The belt 186 and other components (e.g., idlers, pulleys, etc.) are coupled to a frame 198. A motor 200 is coupled to the frame 198 that drives the belt 186.

Figure 6:
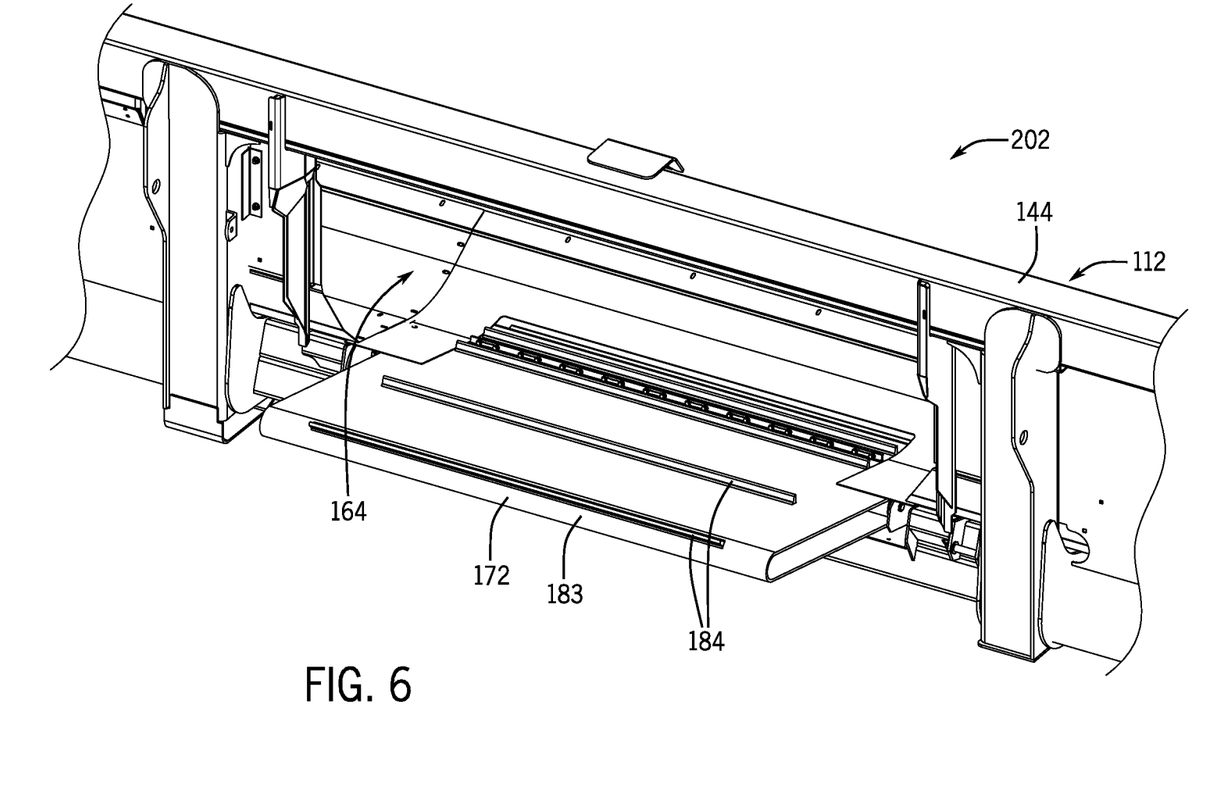
FIG. 6 is a rear perspective view of the header in FIG. 2 (e.g., having a row unit coupled to the header)

As depicted in FIG. 6, a rear portion 183 of the belt conveyor 172 extends beyond the rear portion of the frame 144 of the header into the inlet 164. Also, a row unit 202 is coupled to the header 112. In certain embodiments, multiple row units 202 are coupled to the header 112. The rear portion 183 of the belt conveyor 172 extends into the inlet 164 to ensure the harvested crop material is deposited into the inlet 164.

Figure 7:
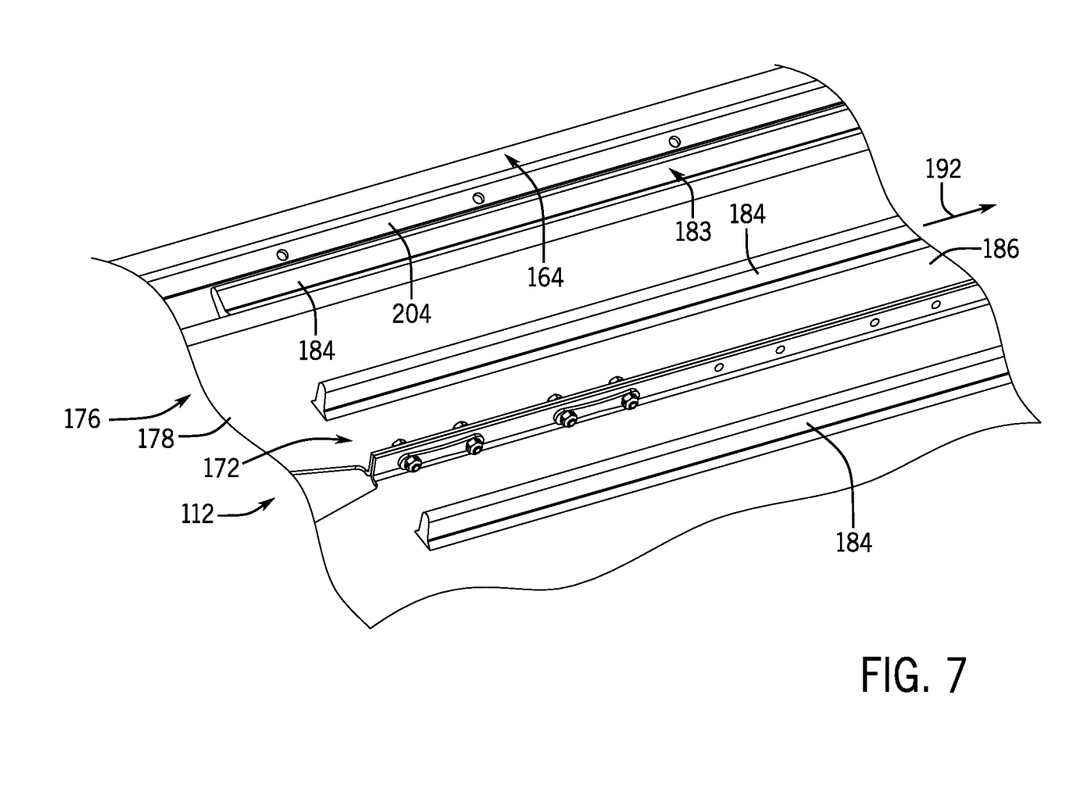
FIG. 7 is a perspective view of an embodiment of a portion of an infeed belt conveyor disposed in a portion of the header.

FIG. 7 is a perspective view of a portion of the belt conveyor 172 disposed in a portion of the header 112. In particular, the belt conveyor 172 is located within the central opening 176 of the header floor or trough (e.g., auger trough) 178. As depicted, the header 112 includes a structure 204 (e.g., sheet metal structure) that extends axially 192 relative to the longitudinal axis 188 of the belt conveyor 172. The structure 204 is located between the inlet 164 of the feederhouse 142 and an outlet of header 112. In particular, the structure 204 is located downstream (relative to flow of the harvested crop material from the header 112 to the feederhouse 142) of the rear portion 183 of the belt conveyor 172 and upstream of the inlet 164. The structure 204 keeps the harvested crop material from passing between an opening between the inlet 164 and the outlet of header 112 and being recirculated within the trough 178. In certain embodiments, a seal 206 may be coupled to an upper portion 208 the structure 204. The protrusions 184 interface with the seal 206 during rotation of the belt 186.

Figure 8:
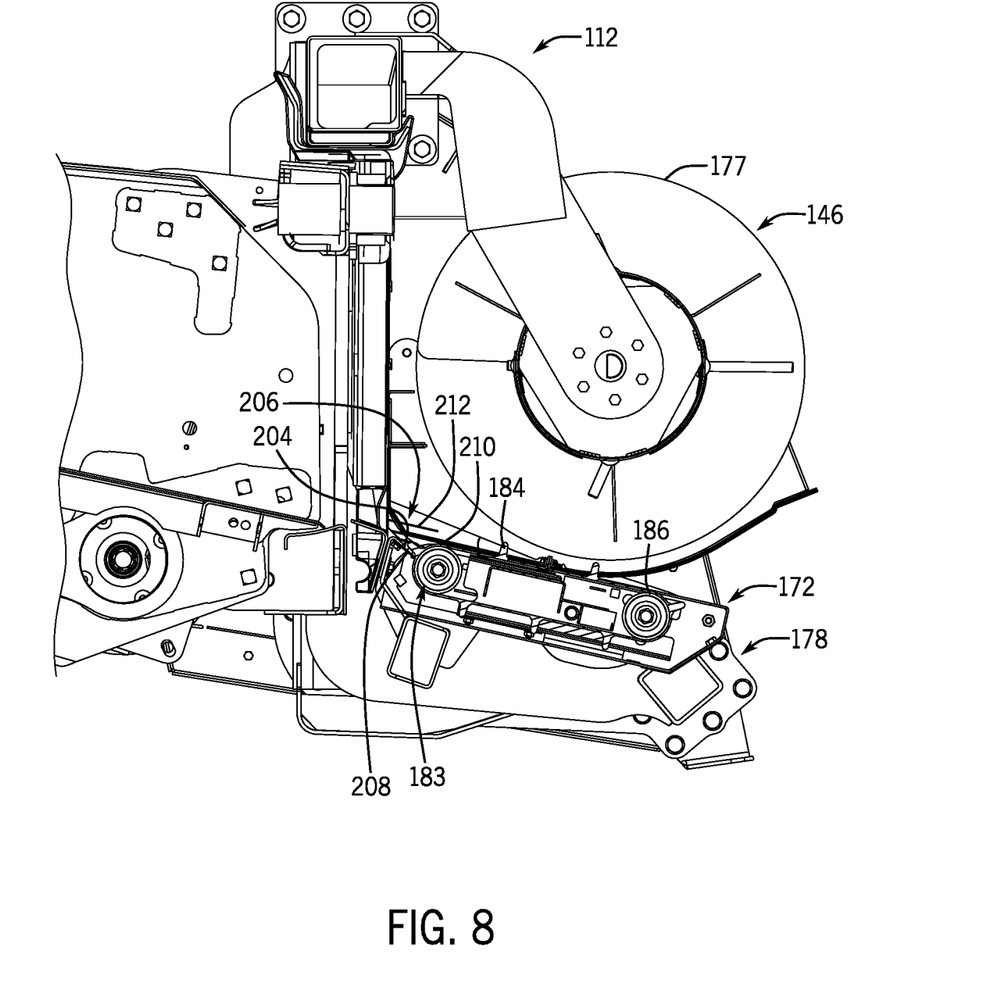
FIG. 8 is a side cross-sectional view of an embodiment of a portion of a feederhouse coupled to a header (e.g., having infeed belt conveyor disposed outside of an inlet of the feederhouse)

As depicted in FIG. 8, the structure 204 has an inverted J-shape or hook-shape for the cross-sectional shape. To further ensure the harvested crop material passes into the inlet 164 of the feederhouse 142, a tangent 210 from the highest point of the rear portion 183 of the belt conveyor 172 is at least even with the uppermost portion of the structure 204. In certain embodiments, the height of the rear portion 183 of the belt conveyor 172 may be higher than the uppermost portion of the structure 204, to enable a tangent 212 from the highest point of the rear portion 183 to be at least slightly above the uppermost portion of the structure 204 (e.g., up to 6.35 mm above).

Figure 9:
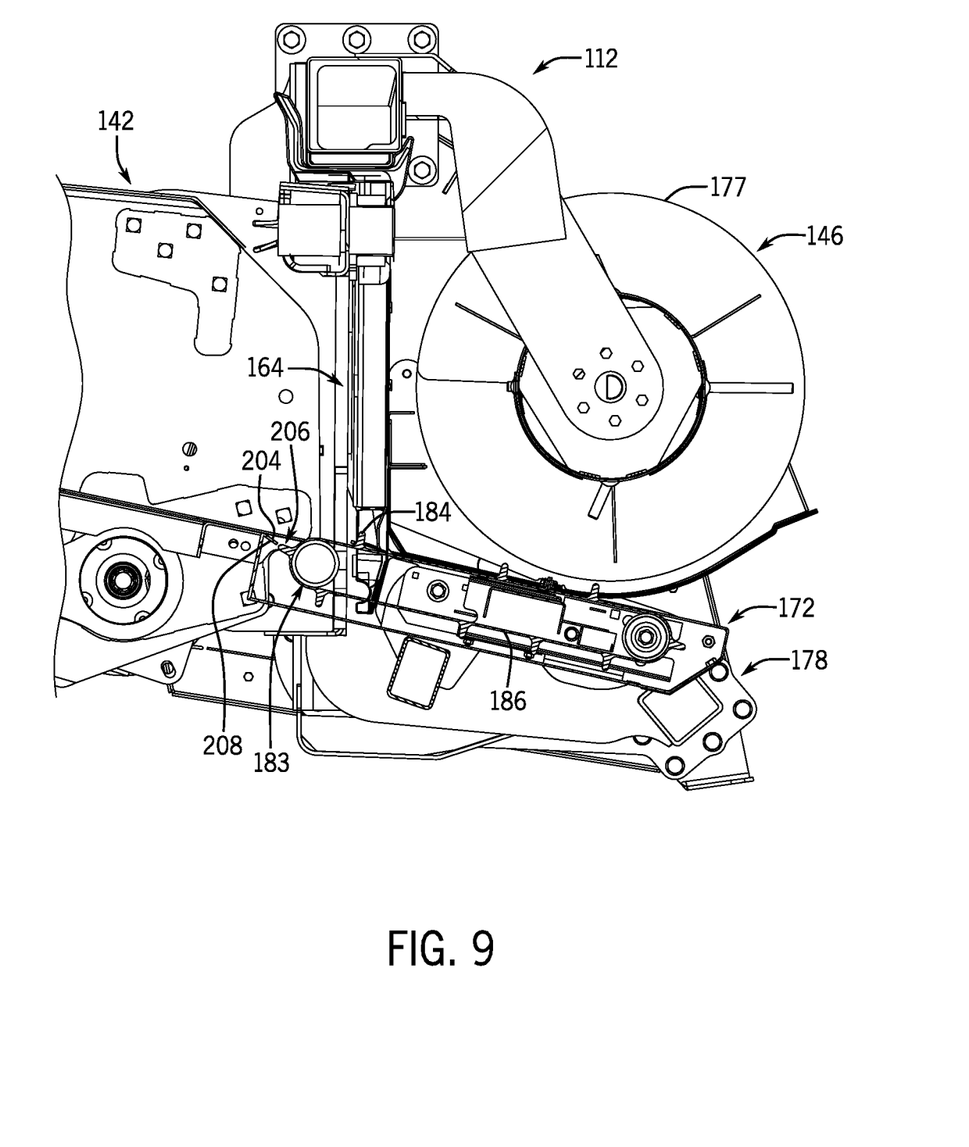
FIG. 9 is a side cross-sectional view of an embodiment of a portion of a feederhouse coupled to a header (e.g., having a portion of infeed belt conveyor disposed outside of an inlet of the feederhouse)

In certain embodiments, it is desirable to keep harvested crop material from falling within a gap in a transition zone (i.e., space between a primary feeding device within the feederhouse 142 and the belt conveyor 172) between the outlet of the header 112 and the inlet 164 of the feederhouse 142. As depicted in FIG. 9, where the rear portion 183 of the belt conveyor 172 extends into the inlet 164 of the feederhouse 142, the structure 204 (as described above) may be part of the feederhouse 142, instead of the header 112. Extending the belt conveyor 172 into the inlet 164 crosses the transition between the outlet of the header 112 and the inlet 164 of the feederhouse 142. In certain embodiments, a primary feeding device (e.g., one or more belt conveyors, one or more chains, etc.) may be disposed in the feederhouse 142. In certain embodiments, the primary feeding device of the feederhouse 142 may extend into the outlet of the header 112 to cross the transition between the outlet of the header 112 and the inlet 164 of the feederhouse 142. In certain embodiments, the belt conveyor 172 and the primary feeding device of the feederhouse 142 may overlap to avoid a gap between them.

Figure 10:
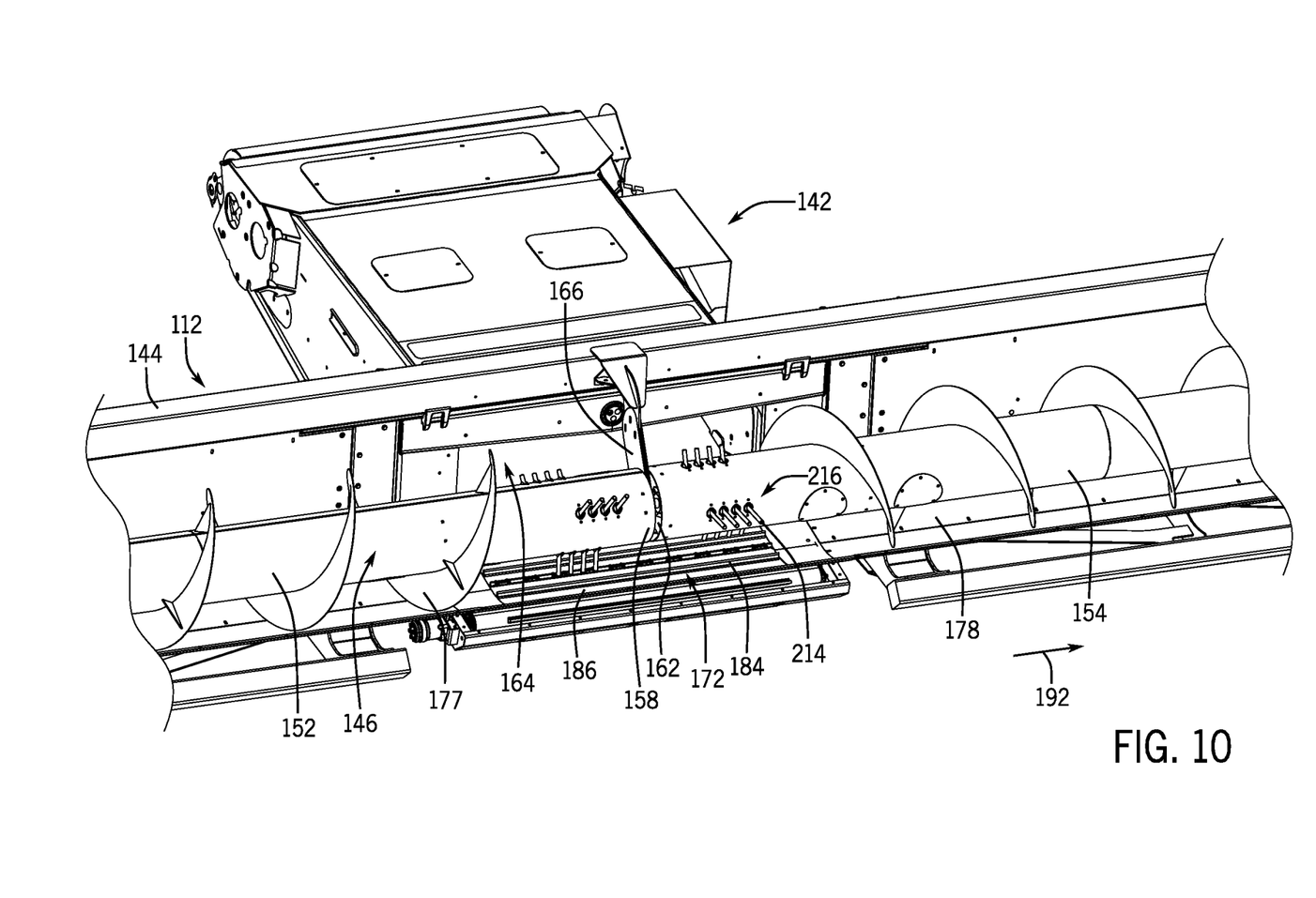
FIG. 10 is a top perspective view of an embodiment of a header (e.g., corn header) coupled to a feederhouse having an auger include retractable protrusions disposed above an inlet belt conveyor.

FIG. 10 is a top perspective view of an embodiment of the header 112 (e.g., corn header) coupled to a feederhouse 142 having the auger 146 include retractable protrusions 214 (e.g., finger-shaped protrusions) disposed above the belt conveyor 172. The auger 146 on each section 152, 154 adjacent respective ends 158, 162 (and adjacent the inlet 164 of the feederhouse 142) includes a plurality of protrusions 214 configured to both extend from the auger 146 and to retract within the auger 146 during rotation of the auger 146 to assist movement of the harvested crop material toward the inlet 164 of the feederhouse 142. In particular, the protrusions 214 begin to retract as the protrusions 214 approach the inlet 164. The protrusions 214 are fully retracted in front of a feeder drum of the feederhouse 142 to minimize the amount of crop material that is carried over the auger 146. As the protrusions 214 pass the feeder drum 174 and encounter the header floor 178 (e.g., auger trough), the protrusions 214 begin to extend. In the fully extended position, the protrusions 214 grab the crop material and work similar to a rake. The protrusions 214 create pressure toward the feeder while reducing recirculation of material away from the feeder to minimize or avoid buildup of MOG in front the inlet 164. The timing of the extension and retraction of the protrusions 214 is adjustable. The protrusions 214 assist the belt conveyor in actively directing movement of the harvested crop material toward the inlet 164.

Each end 158, 162 includes multiple sets 216 of protrusions 214. Each set 216 includes at least two protrusions 214 (e.g., 2, 3, 4, 5, or more protrusions 214). As depicted in 10, each set 216 includes 4 protrusions 214. As depicted, each end 158, 162 includes 4 sets 216 of protrusions 214 evenly space apart circumferentially about the auger 146. The number of sets 216 on each end 158, 162 may vary (e.g., 2, 3, 4, 5, or more sets). Each set 216 is spaced apart circumferentially about the auger 146 from an adjacent set 216 by approximately 90 degrees.

Figure 11:
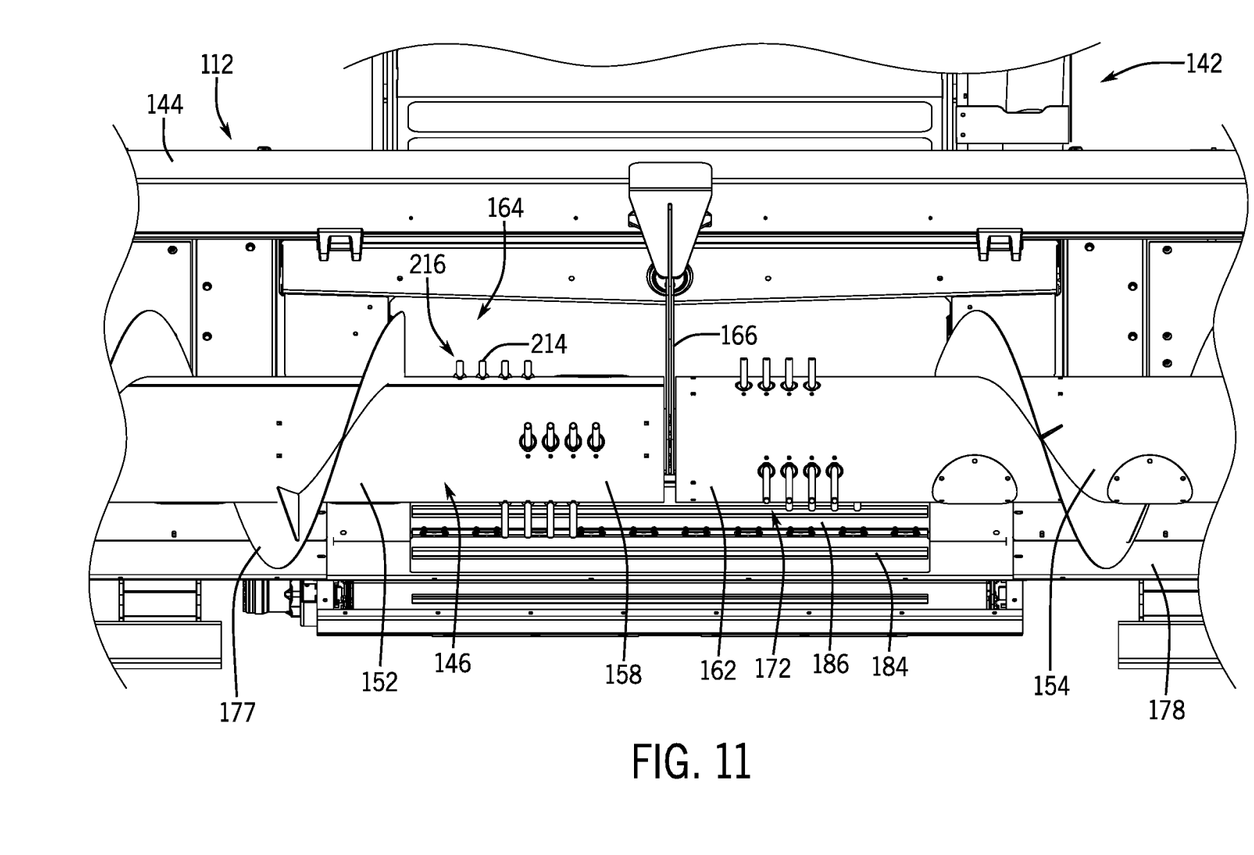
FIG. 11 is a top perspective view of an embodiment of a header (e.g., corn header) coupled to a feederhouse having an auger with full flighting include retractable protrusions disposed above an inlet belt conveyor.

The sets 216 of protrusions 214 on each respective end 158, 162 are partially offset from each other in the axial direction 192 along a longitudinal axis of the auger 146 and a circumferential direction about the auger 146 to form a staggered arrangement. In particular, the sets 216 of protrusions 214 on each respective end 158, 162 are arranged to follow the path (e.g., spiral path) of the crop material about the auger 146. The sets 216 of protrusions 214 adjacent the end 158 are staggered (i.e., not axially aligned along the longitudinal axis of the auger 146) from the sets 216 of protrusions 214 adjacent the end 162. As depicted in FIG. 10, the flighting 177 of the auger 146 ends upstream of the protrusions 214 (e.g., adjacent the outer edge of the inlet 164). In certain embodiments, the flighting 177 may end at or upstream of the inlet 164. As depicted in FIG. 11, the flighting 177 may continue to the ends 158, 162 of the auger 146.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A header of a combine harvester, comprising:
   a belt conveyor that during operation directs a movement of harvested crop material toward a feederhouse of the combine harvester, wherein the belt conveyor is located adjacent an inlet of the feederhouse and comprises at least one protrusion extending radially from the belt conveyor that during operation of the belt conveyor helps direct movement of harvested crop material toward the feederhouse; and
   a header floor extending along a first longitudinal length of the header from adjacent a first longitudinal end of the header to adjacent a second longitudinal end of the header opposite the second longitudinal end, wherein the belt conveyor is located within an opening of the header floor in front of the inlet of the feederhouse.

2. The header of claim 1, wherein the header comprises a corn header.

3. The header of claim 1, wherein belt conveyor extends across an entire width of the inlet of the feederhouse.

4. The header of claim 1, wherein the header comprises an auger that during operation directs the movement of the harvested crop material toward the feederhouse, and the belt conveyor is located beneath the auger.

5. The header of claim 4, wherein the header floor is located beneath the auger.

6. The header of claim 4, wherein the auger extends from adjacent the first longitudinal end of the header to adjacent the second longitudinal end of the header.

7. The header of claim 1, wherein the belt conveyor comprises a plurality of the protrusions.

8. The header of claim 7, wherein the plurality of protrusions are circumferentially spaced apart about a longitudinal axis of the belt conveyor.

9. The header of claim 1, wherein the at least one protrusion extends along a majority of a second longitudinal length of the belt conveyor.

10. A header of a combine harvester, comprising:
    an auger configured to direct a movement of harvested crop material toward a feederhouse of the combine harvester;
    a header floor located beneath the auger; and
    a belt conveyor located within an opening of the header floor in front of an inlet of the feederhouse, wherein the belt conveyor during operation directs the movement of harvested crop material toward the feederhouse of the combine harvester.

11. The header of claim 10, wherein the header comprises a corn header.

12. The header of claim 10, wherein belt conveyor extends across an entire width of the inlet of the feederhouse.

13. The header of claim 10, wherein the belt conveyor comprises at least one protrusion extending radially from the belt conveyor that during operation of the belt conveyor helps direct movement of harvested crop material toward the feederhouse.

14. The header of claim 13, wherein the belt conveyor comprises a plurality of the protrusions.

15. The header of claim 14, wherein the plurality of protrusions are circumferentially spaced apart about a longitudinal axis of the belt conveyor.

16. The header of claim 13, wherein the at least one protrusion extends along a majority of a longitudinal length of the belt conveyor.

17. The header of claim 10, wherein the auger extends from adjacent a first longitudinal end of the header to adjacent a second longitudinal end of the header opposite the second longitudinal end.

18. A combine harvester, comprising:
    a feederhouse comprising an inlet for receiving harvested crop material; and
    a header comprising:
        a belt conveyor that during operation directs a movement of the harvested crop material toward the feederhouse of the combine harvester, wherein the belt conveyor is located adjacent the inlet of the feederhouse and comprises at least one protrusion extending radially from the belt conveyor that during operation of the belt conveyor helps direct movement of harvested crop material toward the feederhouse; and
        an auger that during operation directs the movement of the harvested crop material toward the feederhouse, and a header floor located beneath the auger, the belt conveyor is located within an opening of the header floor in front of the inlet of the feederhouse.

19. The combine harvester of claim 18, wherein the auger extends from adjacent a first longitudinal end of the header to adjacent a second longitudinal end of the header opposite the second longitudinal end.

20. The combine harvester of claim 18, wherein the header floor extends from adjacent a first longitudinal end of the header to adjacent a second longitudinal end of the header opposite the second longitudinal end.

* * * * *